United States Patent Office 3,249,537
Patented May 3, 1966

3,249,537
LIGNOSULFONATE LUBRICANTS
Arnold J. Morway, Clark, and John F. Kunc, Union, N.J., assignors to Esso Research and Engineering Company, a corporation of Delaware
No Drawing. Filed May 16, 1963, Ser. No. 281,052
7 Claims. (Cl. 252—17)

The present invention relates to lubricating compositions containing lignosulfonates and the preparation thereof. More particularly this invention relates to improved lubricating grease compositions which contain metal lignosulfonates. In a specific aspect this invention relates to anti-friction bearing greases having a long lubrication life wherein the grease contains sodium lignosulfonate.

In a ball bearing, operation of the bearing quickly forces all but small quantities of the grease to the sides of the bearing and out of the pathway (race) of the rolling elements. Since only small quantities of grease are necessary to maintain proper lubrication, this phenomona, alone, is not particularly critical. In such a system, the main portion of the grease is thus displayed outside the ball or roller path. A premium quality grease for use in lubricating these bearings should be of such a consistency as to pack around the bearing seals after being displaced from the roller path. This packing action improves the sealing action of the bearing seals. Additionally, such a grease must be sufficiently mobile so that lubricant is continuously supplied to the bearing surfaces. Excessive mobility must be avoided, however, since the rapidly rotating bearing elements may "work" the grease excessively, resulting in increased friction and higher temperatures. Both the heat developed and the shearing effect that takes place tend to promote rapid deterioration of such a grease. Torque losses should be held at a minimum. The torque losses due to grease friction will vary, however, even among greases of the same apparent consistency.

DISCOVERY

It has now been discovered, and this discovery forms the basis of the present invention, that metal lignosulfonates may be added to the formulation of lubricating grease compositions to improve their overall performance. For example, it has been possible to produce a soda grease (Example 5) of the type suitable for the lubrication of anti-friction bearings which contained, as the novel and critical ingredient, sodium lignosulfonate. This grease can be made very cheaply and has been demonstrated to have several-fold the bearing life of a commerically available premium anti-friction bearing grease.

Greases prepared according to the present invention will contain from 1 to 18 wt. percent, perferably from 3 to 10 wt. percent, e.g. 4 to 8 wt. percent of metal lignosulfonate as the novel ingredient (based on a formulation weight of 100 wt. percent).

PREPARATION

Lubricating greases prepared according to the present invention are prepared from routine grease components well known (see, for example, U.S. 2,265,791, U.S. 2,976,-242, and U.S. 3,015,624) to those of average skill in the art (except, of course, for the novel use of the metal lignosulfonates).

Lubricating oils which may be employed include mineral lubricating oils, synthetic esters, complex esters, polymerized olefins, copolymers, alkylene glycols and alkylene oxides, polyorgano siloxanes, polyphenyl ethers, silanes, chlorinated silicones, nitrile silicones, etc. For many of the ordinary applications of this invention, mineral lubricating oils form a preferred class of oils. The lubricating oils used will generally have a viscosity at 100° F. of from 50 to 2000 SUS, usually from 100 to 1200 SUS, and preferably from about 150 to 800 SUS, e.g., 175 to 750 SUS. If desired, a blend of oils of suitable viscosity may be employed.

While many conventional grease thickener systems may be used without departing from the spirit of the present invention, e.g., the fatty acid soaps, mixtures of metal salts of low molecular weight fatty acids and fatty acid soaps, carbon black, copper phthalocyanine, ammeline, indanthrene blue, polyarylureas, etc., it is contemplated that in the ordinary applications of the present invention the grease thickener system employed will be a mixture of a $C_1$ to $C_6$ fatty acid salt and a soap of $C_7$ to $C_{30}$ fatty acid.

According to the preferred form of the present invention, a lubricating oil of the type previously described is mixed with alkali metal lignosulfonate. To this mixture are added the $C_1$ to $C_6$ fatty acid and the $C_7$ to $C_{30}$ fatty acid which are neutralized in situ with a suitable metal base (e.g., NaOH). Mixing and heating are initiated and continued until the temperature is above 375° F., more usually above 400° F., e.g., 425° F. or higher, and the water of reaction has been evaporated (steam evolution from the heated mass subsides). Heating is discontinued and the mass allowed to cool to, for example, 250° F. where various additives may be added (e.g., phenyl alpha naphthylamine) and the grease finished in a conventional manner. Usually, the mass is further cooled to 110–110° F. where it is homogenized and packaged for use.

Various other additives of the usual types such as corrosion inhibitors, oxidation inhibitors, extreme pressure agents, antiwear agents, etc., may be employed in these greases. Suitable oxidation inhibitors include particularly those of the amine type, such as, for example, diphenylamine and tetramethyl diaminodiphenyl methane. Suitable extreme pressure additives include sulfurized fatty oils and lead soaps, which may be employed either separately or in combination. Such compounds may be added to the grease mixture during cooling, preferably when the grease mixture is below about 250° F.

The total combined amount of fatty acid salt and fatty acid soap employed will be sufficient to thicken the mixture to a grease consistency. Generally this will be from 5 to 60 wt. percent of the grease (based on a total charging formulation of 100%) and more usually from 10 to 50 wt. percent, e.g., 20 to 45 wt. percent.

The ratio of low molecular weight fatty acid to $C_7$ to $C_{30}$ fatty acid will vary depending upon the metal component used. For example, it is known that when calcium is used as the metal component, moles ratios of $C_1$–$C_6$ fatty acid (e.g., acetic acid) to $C_7$–$C_{30}$ fatty acid (e.g. hydroxy stearic acid) of from 4:1 to 40:1, e.g., 7:1 to 25:1 should be employed in order to retain structural stability and get the maximum benefit from a high content of combined metal per unit weight of the composition so as to achieve maximum utility for extreme pressure application. (See U.S. 2,976,242 which is incorporated herein by express reference.) Similarly when lithium is employed as the metal, such mole ratios range from about 0.5:1 to 2:1, e.g. 1:1. When sodium is used (as is contemplated herein in the preferred embodiment) these mole ratios will range from about 2:1 to 5:1, e.g., 2.5:1 to 4:1. Selection of appropriate ratios, while of considerable importance, is believed to be well within the skill of the art.

One reason for the in situ neutralization of the high and low molecular weight fatty acids is that some reaction seems to occur between the metal base, e.g., NaOH, and the metal lignosulfonate. The net effect seems to be to enhance the thickening effect of the soap/salt mixture and to increase the total metals content of the grease without departing materially from the optimum ratio of low to high molecular weight acid, e.g., 1:1 for lithium. If desired, the salt of the low molecular weight fatty acid (e.g., calcium acetate) may be preformed and added to the grease in a preformed state, provided that the higher molecular weight fatty acid is neutralized in situ in the presence of the metal lignosulfonate.

THE LIGNOSULFONATES

Lignin is (after cellulose) the principal constituent of wood. While much work has been done in the field of lignin chemistry, very little progress has been made in elucidating the lignin structure. On the basis of the work which has been done, the phenylpropane carbon structure is quite probably a recurring unit in the lignin molecule. How the lignin units are linked together still remains a mystery since not one dimeric lignin degradation product is known to have been isolated from native lignin. There are quite probably many lignins, the composition of each depending to some extent on the source of the lignin.

The elementary composition of lignins ranges from about 61 to 65% carbon, 5.0 to 6.2% hydrogen with the balance as oxygen. The monomeric molecular weight ranges from about 840–880. These monomers appear to be partly aromatic in structure and contain a phenolic hydroxyl group and three or more alcohol groups resembling secondary or tertiary alcohol groups. A number of methoxyl groups also seem to be present. The number of methoxyl groups appears to depend upon the source of the lignin, i.e., hardwood lignins contain more methoxyl groups than do softwood lignins.

Both bark and wood contain lignin in amounts of from about 24–28%. Thus, the primary source of lignin is the waste liquor of the wood pulp industry.

Many of the reactions, properties, etc. of lignins can be explained in part by the following theoretical monomeric structure:

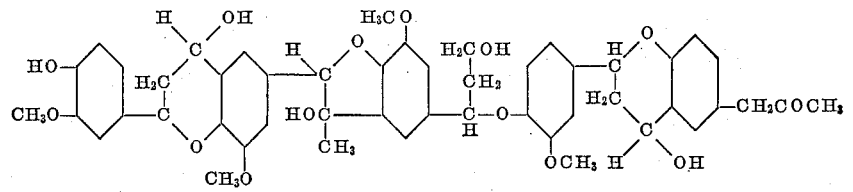

The waste liquor of acid sulfite pulp mills contains no lignin as such, but only the sulfonic acid derivatives. The pulp is usually made by barking and chipping the wood and then cooking it under pressure with a solution of a bisulfite and sulfur dioxide. The base used may be calcium, magnesium, sodium, or ammonium. Commonly, a calcium bisulfite solution is used. The water-insoluble lignins are converted during this process by a little understood mechanism into water-soluble lignin sulfonic acids and their equally soluble calcium salts. The lignin sulfonates in sulfite waste liquor are believed to be polymers having molecular weights of from 1,500 to 15,000. Usually, from 2 to 4 monomer units are present per atom of sulfoxyl sulfur. The calcium of calcium lignosulfonate can be precipitated as calcium sulfate by sulfuric acid leaving the free lignin sulfonic acid which can then be combined with other bases to form the corresponding sulfonates. The lignin sulfonates can also be thermally desulfonated in the presence of alkalies. Lignin has been alkylated, hydrogenated, nitrated, halogenated, oxidized, sulfonated, hydrolyzed, etc., and there is voluminous literature on these subjects. (E.g., F. E. Brauns in "The Chemistry of Lignin," Academic Press, New York, 1951, with its 1960 supplement.) Also, lignin may be fermented to reduce its sugar content or to increase its content of organic acids.

It can easily be appreciated that it is possible to produce metal lignosulfonates by a variety of different techniques. Lignosulfonates thus prepared may contain very little sulfonation (in terms of moles of sulfonation per lignin unit) or may contain a high degree of sulfonation (per lignin unit). These metal lignosulfonates are commercially available and their preparation, per se, is not a part of the present invention.

Among the many commercial available metal lignosulfonates are the sodium lignosulfonates sold by the West Virginia Pulp & Paper Co. of Charleston, South Carolina. These are sold under the names Polyfon H, O, T, R and F and contain respectively one-half, one, two, three and four moles of sulfonation per lignin unit of 840 grams. For purposes of illustration, these products have been used in the working examples of the present invention.

For purposes of the present invention, lignosulfonates containing at least about one mole of sulfonation per lignin unit are employed. Preferably, the degree of sulfonation is greater than about 1.5 moles of sulfonation per lignin unit and even more preferably, it is above 2.5. A particularly preferred material for purposes of the present invention is a lignosulfonate having a degree of sulfonation greater than about 3.5, e.g., 4.0 moles of sulfonation. The increase in sulfonation improves the stability of the dissolved lignosulfonates under acid conditions and increases the alkalinity of their water solutions. The increase in sulfonation also improves the consistency of the greases.

While the reason for their effectiveness is not completely understood, the presence of the metal lignosulfonates in grease formulations dramatically increases the ultimate lubrication life of the greases without detriment to the other grease properties.

FATTY ACIDS

Suitable low molecular weight fatty acids include the $C_1$ to $C_6$ fatty acids, e.g., formic acid, acetic acid, propionic acid, n-butanoic acid, hexanoic acid, etc. Acetic acid is the preferred low molecular weight fatty acid.

Suitable higher molecular weight fatty acids include the $C_7$ to $C_{30}$ fatty acids such as caprylic acid, pelargonic acid, $C_{10}$ oxo acid, myristic acid, stearic acid, 12-hydroxy stearic acid, arachidic acid, oleic acid, palmitic acid, ricinoleic acid, hydrogenated fish oil, tallow acids, linoleic acid, elaidic acid, etc. $C_{12}$ to $C_{24}$ acids of this type are preferred for many ordinary applications. If desires, a mixture of these acids may be employed.

Recently, a very low price fatty acid material comprising chiefly elaidic acid with minor amounts of oleic acid (9-octadeceneoic acid) and other isomers of oleic acid, e.g., 12-octadeceneoic acid and linoleic acid, etc., has become commercially available under the general name of iso-oleic acid. This acid differs from pure oleic acid in that its chief component, i.e., elaidic acid, is in the cis or syn isomeric form, rather than the more common trans or anti form of oleic acid.

The iso-oleic acid may be 100% oleic acid in the cis form, i.e., elaidic acid. However, commercial iso-oleic acid generally constitutes a mixture of a major amount of elaidic acid with minor amounts of oleic acid (i.e. 9-octadeceneoic acid) and other related acids such as 12-octadeceneoic, linoleic, linolic, stearic, palmitic, etc.

An iso-oleic acid, available from Emery Industries, under the name Emery 636 fatty acid, was used in the working examples of the invention. This acid has the following typical characteristics:

Titer,[1] ° C. _____ 32
Iodine value (Wijs) _____ 70
Free fatty acids (percent as oleic) _____ 91
Acid value _____ 182
Saponification value [2] _____ 189
Color, Gardner _____ 8

[1] The titer noted above is a false titer, since in derivatives, the acid acts as a lower titered acid.
[2] Contains an inter-ester easily broken by saponification techniques.

METAL COMPONENTS

The metal components of the salts/soaps may be an alkali metal or an alkaline earth metal, e.g., Na, K, Li, Sr, Ba, Ca, etc. or mixtures thereof. These metals may be used in any convenient form, e.g. hydroxides, oxides, etc. For many of the ordinary applications of this invention the alkali metals are preferred and sodium is the more preferred.

EXAMPLES

The present invention will be more clearly understood by reference to the following specific examples which include a preferred embodiment. Unless otherwise indicated, all parts are by weight.

Example 1

59.6 parts of a mineral lubricating oil (Coray 55) having a viscosity at 100° F. of 512, a viscosity index of 43, and a pour point of minus 15° F. was intimately mixed in a gas heated grease kettle with 15 parts of fatty acid (Emery 636) and 5 parts of a sodium lignosulfonate having one-half mole of sulfonation per lignin unit (Polyfon H). To this mixing mass was added 9.6 parts of sodium hydroxide in the form of a 40 wt. percent aqueous solution. Glacial acetic acid (ten parts) was then added rapidly in increments. Heating and mixing continued until the temperature reached 430° F. and steam evolution subsided. Heating was discontinued and the grease was allowed to cool (while mixing to 250° F. Here one part of phenyl alpha naphthylamine was added and the grease cooled to 100° F. The grease was then homogenized. The formulation and properties of this grease are shown in Table I.

Example 2

The procedure followed in Example 1 was repeated using a sodium lignosulfonate having one mole of sulfonation per lignin unit (Polyfon O). The formulation and properties of that grease are shown in Table I.

Example 3

The procedure followed in Example 1 was repeated using a sodium lignosulfonate having 2 moles of sulfonation per lignin unit (Polyfon T). The formulation and properties of that grease are shown in Table I.

Example 4

The procedure followed in Example 1 was repeated using a sodium lignosulfonate having 3 moles of sulfonation per lignin unit (Polyfon R). The formulation and properties of that grease are shown in Table I.

Example 5

The procedure followed in Example 1 was repeated using a sodium lignosulfonate having 4 moles of sulfonation per lignin unit (Polyfon F). The formulation and properties of that grease are shown in Table I.

Example 6

The procedure following in Example 1 was repeated using a sodium lignosulfonate having 4 moles of sulfonation per lignin unit (Polyfon F) and a 10 wt. percent solution of $LiOH.H_2O$ in lieu of the sodium hydroxide. The formulation and properties of that grease are shown in Table I.

TABLE I

| Charging formulation | 1 | 2 | 3 | 4 | 5 | 6 | 7 |
|---|---|---|---|---|---|---|---|
| Lignosulfonate | 5.0 | 5.0 | 5.0 | 5.0 | 5.0 | 5.0 | 4.0 |
| Lubricating oil | 59.6 | 59.6 | 59.6 | 59.5 | 59.4 | 59.5 | 67.4.[1] |
| $C_1$-$C_6$ acid | 10.0 | 10.0 | 10.0 | 10.0 | 10.0 | 10.0 | 8.0 |
| $C_7$-$C_{30}$ acid | 15.0 | 15.0 | 15.0 | 15.0 | 15.0 | 15.0 | 12.0 |
| Metal base | 9.4 [2] | 9.4 [2] | 9.4 [2] | 9.5 [2] | 9.6 [2] | 9.5 [3] | 7.6.[3] |
| Phenyl alpha naphthylamine | 1.0 | 1.0 | 1.0 | 1.0 | 1.0 | 1.0 | 1.0 |
| Properties: | | | | | | | |
| Appearance | Very grainy (undesirable). | Fairly smooth but still too grainy. | Smooth | Very smooth | Excellent, smooth, dark brown. | Excellent, smooth, dark brown. | Excellent, smooth. |
| ASTM dropping point (° F.) | 400 | | | | 500+ | 450 | 450+. |
| ASTM penetration at 77° F. (mm./10): | | | | | | | |
| Unworked | 295 | 275 | 260 | 260 | 250 | 285 | 300. |
| Worked 60x | 310 | 280 | 300 | 295 | 290 | 295 | 310. |
| Worked 10,000x | Fluidized | 340 | 301 | 300 | 299 | 300 | 315. |
| ABEC-NLG1 lubrication life (hrs.), [4] 300° F. | No more tests. | No more tests. | 1,500 | 2,000 plus 1,800 | | | 2,000 plus. |
| Water solubility | Water soluble. | Water soluble. | Water soluble. | Water soluble. | Soluble in hot water. | Soluble in hot water. | Soluble in hot water. |

[1] Di-2-ethylhexyl sebacate.  [2] Sodium hydroxide.  [3] Lithium hydroxide monohydrate.  [4] 204 bearing at 10,000 r.p.m.

Example 7

The general procedure followed in Example 1 was repeated using these ingredients: 4 parts of a sodium lignosulfonate having 4 moles of sulfonation per lignin unit (Polyfon F), 8 parts of acetic acid, 12 parts of fatty acid (Emery 636), 7.6 parts of a 10 wt. percent solution of $LiOH.H_2O$, one part of phenyl alpha naphthylamine, and 67.4 parts of a synthetic oil (di-2-ethylhexyl sebacate) in lieu of the mineral oil. The formulation and properties of that grease are shown in Table I.

It can be seen from Table I, that a soda grease (Example 1) formulated from a sodium lignosulfonate having one-half mole of sulfonation per lignin unit (Polyfon H) produced a grease of unsuitable structure (i.e., grainy). The effect of increasing the degree of sulfonatoin (Examples 2-5) was to improve both the grease structure and increase the lubrication life. The grease of Example 5 was compared with a commercially available premium grade anti-friction bearing grease identified as BOEPL-C. The grease of Example 5 had an ABEC-NLGI lubrication life (10,000 r.p.m.; 204 bearing; 300° F.) of over 2000 hours while BOEPL-C had a life of 320 hours under the same conditions. Examples 6 and 7 illustrate the adaptability of the present invention to systems employing other basically reacting compounds (e.g., lithium hydroxide monohydrate) and other base oils (e.g., di-2-ethylhexylsebacate).

Having described this invention with a certain degree of particularity, it will be realized that numerous modifications and adaptations can be made without departing from the spirit and scope of the invention as hereinafter claimed.

What is claimed is:
1. A lubricating grease composition formulated essentially from the following ingredients:
   (a) about 5 parts by weight of a sodium lignosulfonate containing about 4 moles of sulfonation per lignin unit of 840 grams,
   (b) about 10 parts by weight of $C_1$ to $C_6$ fatty acid,
   (c) about 9.6 parts by weight of a basically reacting sodium compound,
   (d) about 59.4 parts by weight of a mineral lubricating oil having a viscosity at 100° F. from 175 to 750 SUS, and
   (e) about 1 part by weight of phenyl alpha naphthylamine.
2. A lubricating grease composition formulated essentially from the following ingredients:
   (a) a mineral lubricating oil having a viscosity at 100° F. from 150 to 800 SUS,
   (b) from 4 to 8 weight percent of metal lignosulfonate, said lignosulfonate containing about 1 to 4 moles of sulfonation per lignin unit of 840 grams, and
   (c) a grease thickening amount of from 20 to 45 weight percent of metal salts of a $C_1$ to $C_6$ fatty acid and a $C_7$ to $C_{30}$ fatty acid in a molar ratio of or about 0.5:1 to 5:1; said metal component of said salts and said lignosulfonate being selected from the group consisting of alkali metals.
3. A lubricating grease composition formulated essentially from the following ingredients:
   (a) a lubricating oil having a viscosity of from 100–1200 SUS at 100° F.,
   (b) from 3–10 weight percent of metal lignosulfonate containing about 1 to 4 moles of sulfonation per lignin unit of 840 grams, and
   (c) a grease thickening amount of from 5–60 weight percent of a metal salt of a $C_1$ to $C_6$ and a $C_7$ to $C_{30}$ fatty acid in a molar ratio of from about 0.5:1 to 4.0:1; said metal component of said salts and said lignosulfonate being selected from the group consisting of alkali metals, alkaline earth metals, and mixtures thereof.
4. A lubricating grease composition characterized by the presence of from 1 to 18 weight percent of metal lignosulfonate in the formulation of said grease, said metal being selected from the group consisting of alkali metals, alkaline earth metals, and mixtures thereof and said lignosulfonate containing at least about one mole of sulfonation per lignin unit of 840 grams.
5. A lubricating grease composition characterized by the presence of from 3 to 10 weight percent of an alkali metal lignosulfonate in the formulation of said grease, said lignosulfonate containing from about two to four moles of sulfonation per lignin unit of 840 grams.
6. A lubricating grease composition characterized by the presence of from 4 to 8 weight percent of sodium lignosulfonate in the formulation of said grease, said lignosulfonate containing from about three moles to four moles of sulfonation per lignin unit of 840 grams.
7. A lubricating grease composition as defined in claim 6 wherein said lignosulfonate contains about four moles of sulfonation per lignin unit of 840 grams.

References Cited by the Examiner

UNITED STATES PATENTS

| | | | |
|---|---|---|---|
| Re. 23,082 | 1/1949 | Zimmer et al. | 252—33.2 |
| 2,487,080 | 11/1949 | Swenson | 252—33.3 |
| 2,610,946 | 9/1952 | Eckert | 252—33.3 |
| 2,846,392 | 8/1958 | Morway et al. | 252—39 X |
| 2,854,408 | 9/1958 | Brugmann et al. | 252—33 |
| 2,856,362 | 10/1958 | Morway | 252—33.2 |
| 3,013,972 | 12/1961 | Odell et al. | 252—33 |
| 3,125,521 | 3/1964 | Detweiler et al. | 252—33.2 |

FOREIGN PATENTS 641,815   5/1962   Canada.

DANIEL E. WYMAN, *Primary Examiner.*